(12) United States Patent
Mallinger et al.

(10) Patent No.: US 10,293,779 B2
(45) Date of Patent: May 21, 2019

(54) EXTERNAL TETHER AIRBAG

(71) Applicant: Key Safety Systems, Inc., Sterling Heights, MI (US)

(72) Inventors: Heather Mallinger, Shelby Township, MI (US); William Siewert, Macomb, MI (US); Mouaying Vang, Sterling Heights, MI (US); Daniel Clyne, Royal Oak, MI (US)

(73) Assignee: Key Safety Systems, Inc., Sterling Heights, MI (US)

( * ) Notice: Subject to any disclaimer, the term of this patent is extended or adjusted under 35 U.S.C. 154(b) by 5 days.

(21) Appl. No.: 15/714,042

(22) Filed: Sep. 25, 2017

(65) Prior Publication Data
US 2018/0093635 A1 Apr. 5, 2018

Related U.S. Application Data

(60) Provisional application No. 62/402,390, filed on Sep. 30, 2016.

(51) Int. Cl.
*B60R 21/16* (2006.01)
*B60R 21/2338* (2011.01)
*B60R 21/205* (2011.01)

(52) U.S. Cl.
CPC ........ *B60R 21/2338* (2013.01); *B60R 21/205* (2013.01); *B60R 2021/161* (2013.01); *B60R 2021/23386* (2013.01)

(58) Field of Classification Search
CPC .......................... B60R 21/16; B60R 2021/161
USPC ........................................... 280/743.1, 743.2
See application file for complete search history.

(56) References Cited

U.S. PATENT DOCUMENTS

| | | | | |
|---|---|---|---|---|
| 5,588,674 A * | 12/1996 | Yoshimura | ............. | B60R 21/16 280/728.1 |
| 5,865,466 A * | 2/1999 | Yamamoto | ............. | B60R 21/201 280/743.1 |
| 6,585,292 B2 * | 7/2003 | Abe | ............. | B60R 21/20 280/728.1 |
| 6,883,831 B2 * | 4/2005 | Hawthorn | ............. | B60R 21/16 280/739 |
| 6,955,377 B2 * | 10/2005 | Cooper | ............. | B60R 21/233 280/743.1 |
| 7,152,875 B2 * | 12/2006 | Kai | ............. | B60R 21/203 280/739 |

(Continued)

*Primary Examiner* — Toan C To
(74) *Attorney, Agent, or Firm* — Markell Seitzman; David L. King

(57) ABSTRACT

An airbag has an inflatable airbag cushion having panels of material joined to create the inflatable airbag cushion including a neck portion for receiving inflation gas at an inflation inlet and a generally opposed front face portion. An externally attached guide panel of material is externally affixed to the airbag cushion at a first end at least halfway toward the opposed front face portion relative to the neck portion or affixed at the front face portion and a second end is connected at the neck portion of the airbag cushion or in close proximity to the airbag cushion near the inflation inlet. The externally attached guide panel is only attached at the first and second ends and upon inflation of the airbag cushion the externally attached guide panel tightens between the first and second ends directing the airbag deployment towards a seat-belted occupant.

8 Claims, 6 Drawing Sheets

(56) References Cited

U.S. PATENT DOCUMENTS

| | | | |
|---|---|---|---|
| 7,658,408 B2* | 2/2010 | Zofchak | B60R 21/20 280/743.1 |
| 7,793,978 B2* | 9/2010 | Vigeant | B60R 21/233 280/732 |
| 9,598,041 B2* | 3/2017 | Kwon | B60R 21/216 |
| 2003/0189327 A1* | 10/2003 | Burdock | B60R 21/201 280/743.2 |
| 2007/0007757 A1* | 1/2007 | Bauer | B60R 21/20 280/743.2 |

* cited by examiner

EXTERNAL TETHER AIRBAG

This application claims the benefit of U.S. Provisional Application 62/402,390, filed on Sep. 30, 2016. The disclosure of the above application is incorporated herein by reference.

FIELD OF THE INVENTION

The present invention relates to an airbag cushion generally, more specifically to a passenger side airbag with a directionally guided deployment capability.

BACKGROUND OF THE INVENTION

Airbags, when inflated, deploy extremely rapidly to protect the occupant. Several techniques have been developed to alter the rate of inflation and to control the impact forces generated by the airbag such as internal tethers, vents and tear seams. Most commonly, these devices reduce impact forces.

U.S. Pat. No. 8,042,832, "Airbag of Vehicle" by Kim, teaches the use of a plurality of external tethers being sewn to the cushion to suppress initial deployment. These tethers have been stitched along the cushion and break sequentially according to deployment pressure.

The present invention, as described below, uses a different form of device to control the deployment direction of an inflating airbag and as such creates a unique way to impart controlled directionality to an inflating airbag.

SUMMARY OF THE INVENTION

An airbag has an inflatable airbag cushion having panels of material joined to create the inflatable airbag cushion including a neck portion for receiving inflation gas at an inflation inlet and a generally opposed front face portion. The inflatable airbag cushion inflates upon deployment of an inflator (also referred to in the art as a gas generator) during an accident from a stowed uninflated condition to an inflated condition providing a safety barrier for an occupant. A guide panel of material is externally affixed to the airbag cushion at a first end at least halfway toward the opposed front face portion relative to the neck portion or affixed at the front face portion and a second end is connected at the neck portion of the airbag cushion or in close proximity to the airbag cushion near the inflation inlet. The externally attached guide panel is only attached at its first and second ends and upon inflation of the airbag cushion the externally attached guide panel tightens between the first and second ends, directing the airbag deployment as it extends towards a seat-belted occupant.

The second end of the externally attached guide panel can be configured to be connected to an airbag housing. Preferably, the externally attached guide panel has a width that approximates a width of the neck portion of the airbag cushion. The externally attached guide panel can have a length shorter than the distance between the neck portion and an outermost region of the front face portion, insuring the front face portion upon inflation initially contacts the occupant. The connected first end and the connected second end extend across the width of the externally attached guide panel and are parallel and the direction of airbag deployment is substantially perpendicular to the connections. The airbag cushion has an upper portion and a lower portion and the externally attached guide panel can be connected either to the upper or lower portion. The airbag can also have a second externally attached guide panel connected at first or second ends and positioned oppositely to the externally attached guide panel on an opposed upper or lower portion.

In an alternative embodiment, the airbag cushion further includes a pair of sides, a first side and a second opposite side with a guide panel connected along the first or the second side of the airbag and further has a second external guide panel attached to the opposite side of the airbag. The inflatable airbag cushion is configured to fit inside a passenger side airbag housing.

BRIEF DESCRIPTION OF THE DRAWINGS

The invention will be described by way of example and with reference to the accompanying drawings in which.

DETAILED DESCRIPTION OF THE INVENTION

Figure 1:
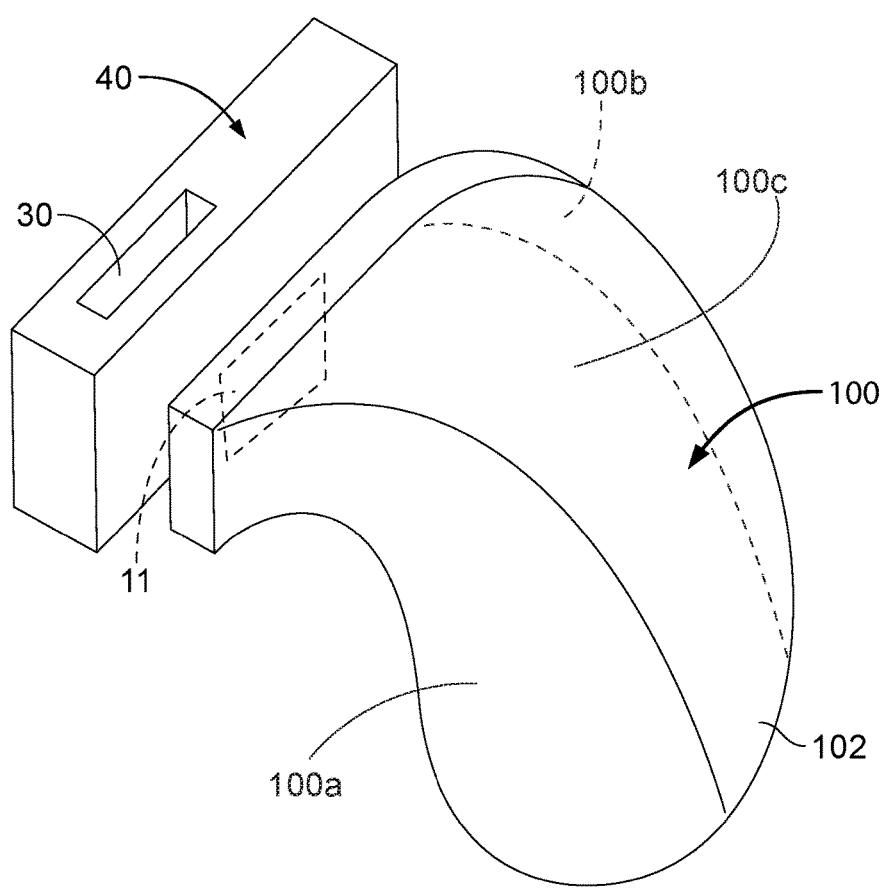
FIG. 1 is a perspective view of an exemplary inflatable airbag and a module housing according to the prior art.

With reference to FIG. 1, a perspective view of a prior art airbag 100 is illustrated. The airbag can be affixed to an airbag module housing 40 shown as a separate element separated from the airbag 100. During normal assembly of the airbag cushion 102 to the module housing 40, the airbag 100 is folded and neatly tucked into an open side of the airbag module housing 40. An end 11 for inflation gas is also illustrated in FIG. 1; this inflation inlet 11 generally fits over an inflator located in the housing and provides an opening for the inflation gases from the inflator to fill the airbag 100 during deployment in the event of a crash to provide a protective barrier for a seated occupant. As shown the prior art airbag 100, as illustrated, is for a passenger side airbag.

Figure 2:
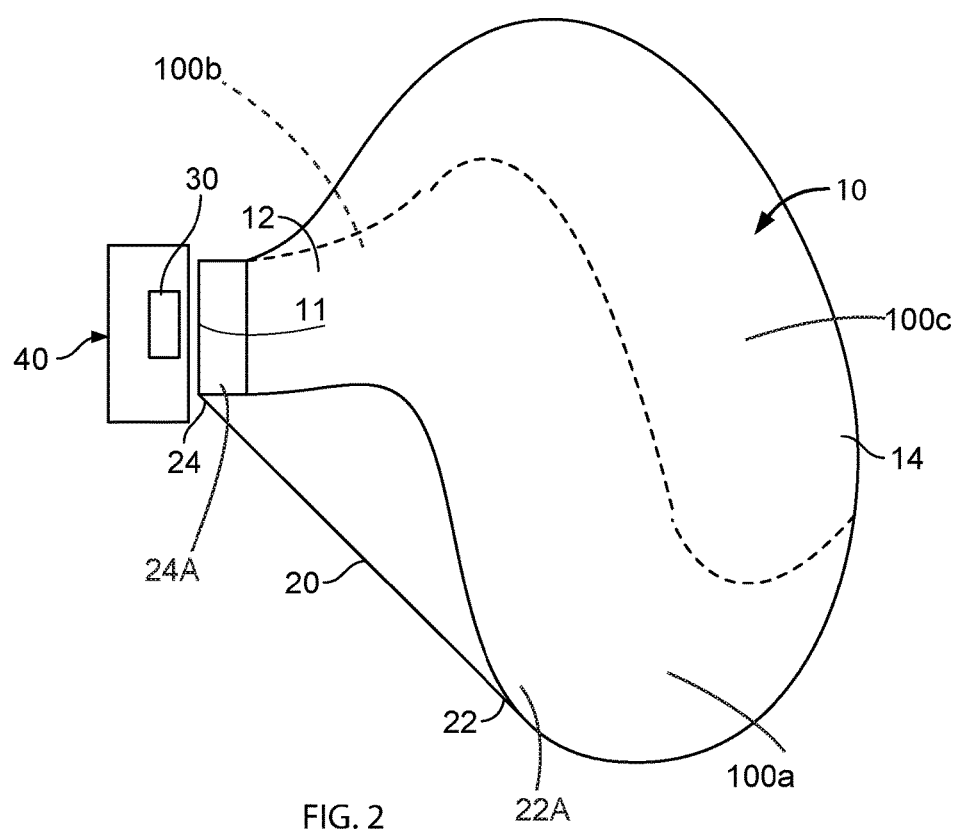
FIG. 2 is a side view of an airbag and housing module showing the externally attached guide panel attached to the airbag cushion according to an embodiment made according to the present invention.

With reference to FIG. 2, a side view of an airbag module is illustrated. The module includes housing 40 and an airbag 10 with a front face portion 14 and a neck portion 12 with an inflation inlet 11 at the neck portion 12. The airbag 10 includes opposing side panels 100a and 100b and a main panel 100c secured to the periphery of the side panels in a known manner. The side panels and main panel form the neck portion. A forward region of the main panel forms the face panel 14. As is known in the art a basic passenger airbag can be constructed in many ways. The airbag module housing 40 is shown separate from the airbag 10. An external guide panel 20 is affixed to the airbag. The panel 20 has a first end 22 and a second end 24. The guide panel 20 is preferably made of a material similar to the airbag cushion or can alternatively be made of other materials. The width of the panel 20 in some embodiments can be approximately equal to a width of the neck portion 12 of the airbag 10. End 22 of the guide panel 20 runs across the airbag and is secured at location or region 22A. End 24 is attached at a mounting location or region 24A across the airbag proximate the neck portion 12 of the airbag or, alternatively, can be affixed so it crosses the mouth of the airbag housing 40. Location 22A is generally in a portion of the main panel opposite the occupant to be protected. The location or region where end 22 of panel 20 is secured to the airbag 100 is generally at least 50% of the distance of mounting location or region 24A and the inflated end of the face panel 14, however, this can vary with requirements. The airbag 10 is then folded and placed into the airbag housing 40 and is in communication with airbag inflator 30, which is located in the housing or at some other convenient location. Upon activation of the airbag inflator, the airbag 10 will deploy. As the airbag 10 is deploying, the guide panel 20 directionally controls the trajectory of the opening airbag. Panel 20 will move with the deploying airbag and when tensioned will prevent the lower portion of the airbag from moving further.

Figure 3:
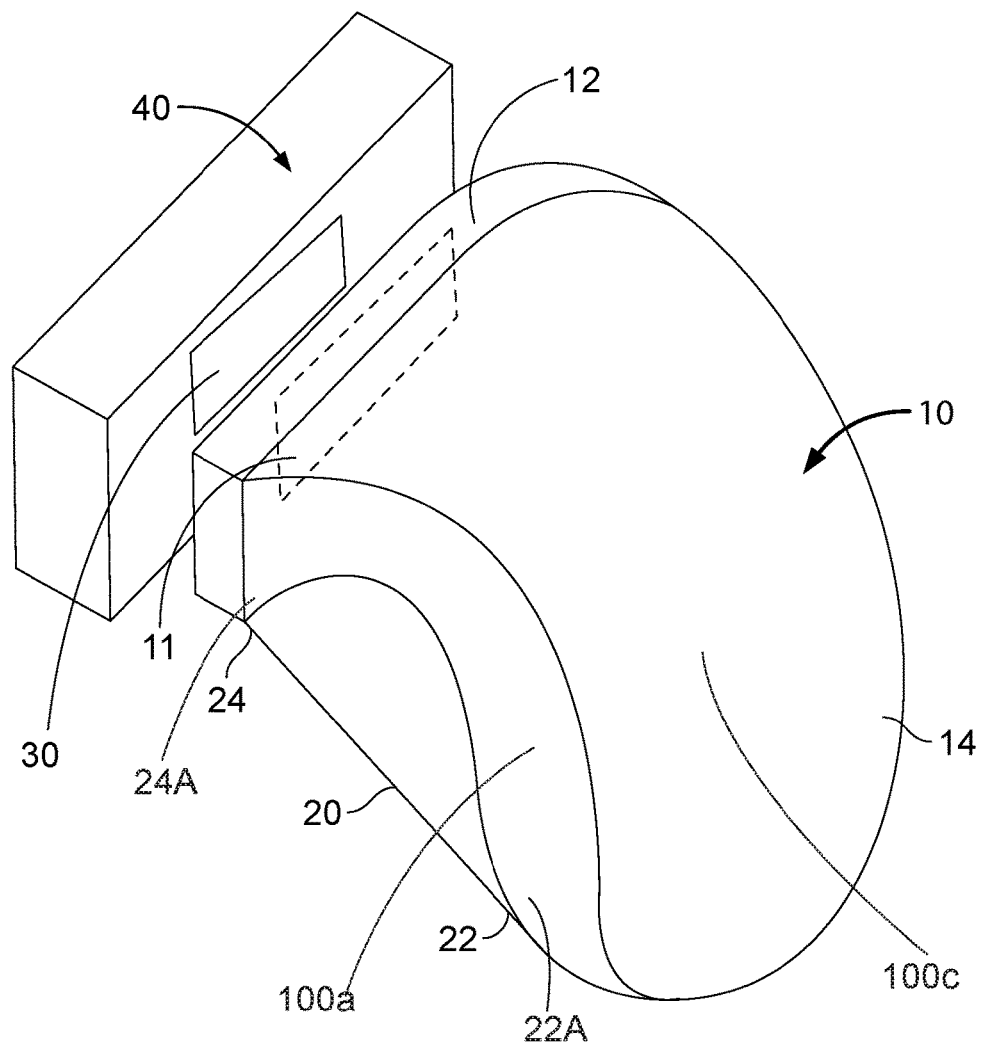
FIG. 3 is a perspective view taken from FIG. 2.

FIG. 3 similarly shows an isometric configuration of the airbag 10 shown in FIG. 2. As mentioned the guide panel 20 being fixed at the first end 22 and the second end 24 allows the guide panel 20 to tighten on deployment. This is configured to happen prior to the airbag 10 impacting the occupant. This tightening will vary depending on the length and the attachment locations of the guide panel 20. In this embodiment the guide panel 20 is attached to a lower portion of the airbag cushion 10 and also to the cushion proximate the neck 12. In FIG. 3 end 24 of guide panel 20 as previously mentioned is secured to housing 40. The neck of a passenger bag is preferably narrower than the face panel and other parts connected to the face panel.

Figure 4:
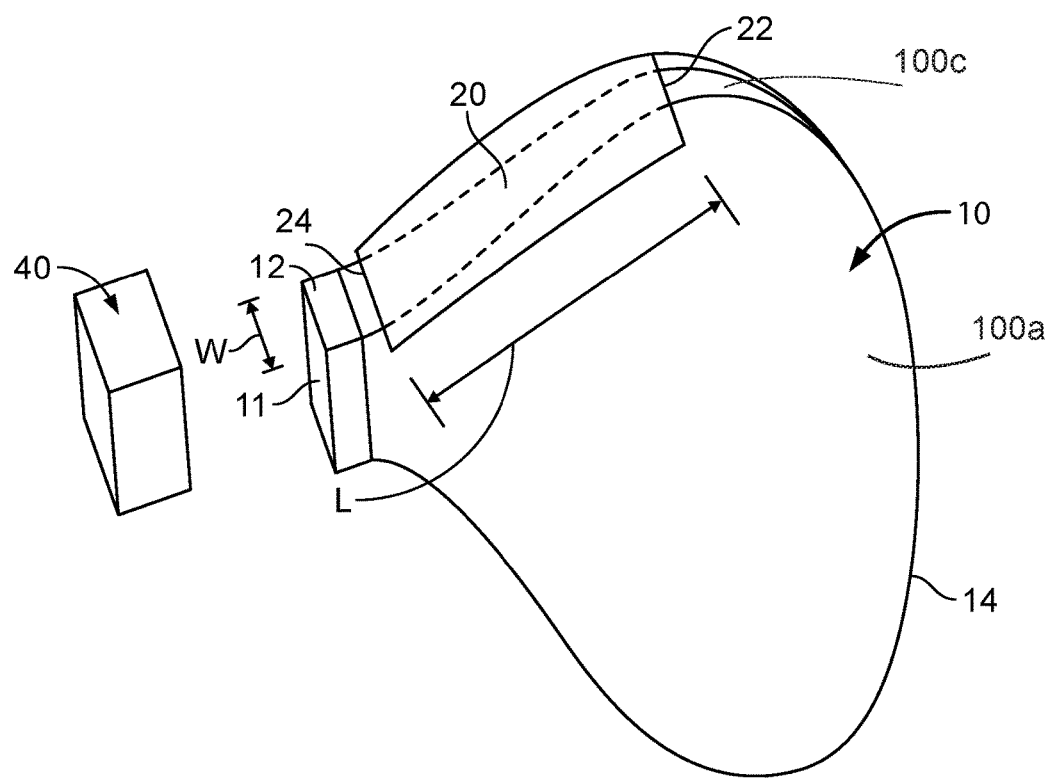
FIG. 4 is a perspective view of a preferred embodiment of the present invention with the externally attached guide panel affixed to the top portion of the airbag cushion.

With reference to FIG. 4, a preferred alternative embodiment is shown where the airbag 10 has the guide panel 20 affixed at its end 22 to an upper portion of the airbag 10 at a location or region generally in a region above or at what is referred to as the face panel (or face panel portion of the main panel). The guide panel 20 is affixed at its end 24 at location or region across or near the neck portion 12. In FIG. 4 end 24 of panel 20 is affixed across a portion of the housing 40 at a location or region. The inflation inlet 11 is illustrated for receiving inflation gas. As shown the guide panel 20 has a generally uniform width, approximately equal to the width of the neck portion 12 of the airbag. This width can vary along the length of the guide panel 20 to approximate a trapezoidal shape and the length of the guide panel 20 can be selectively chosen for optimal control of the airbag 10 on deployment.

Figure 5:
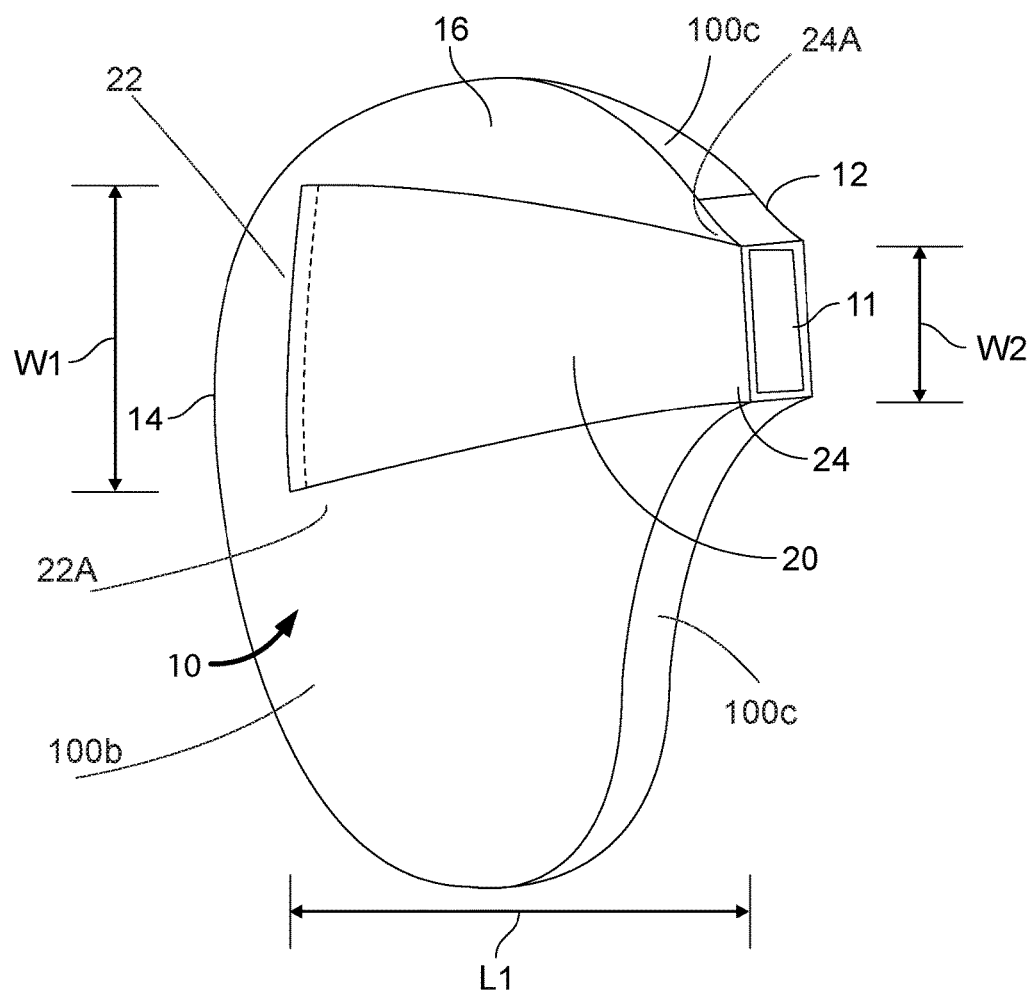
FIG. 5 is a perspective view of another embodiment showing a side attachment of the externally attached guide panel.
Figure 6:
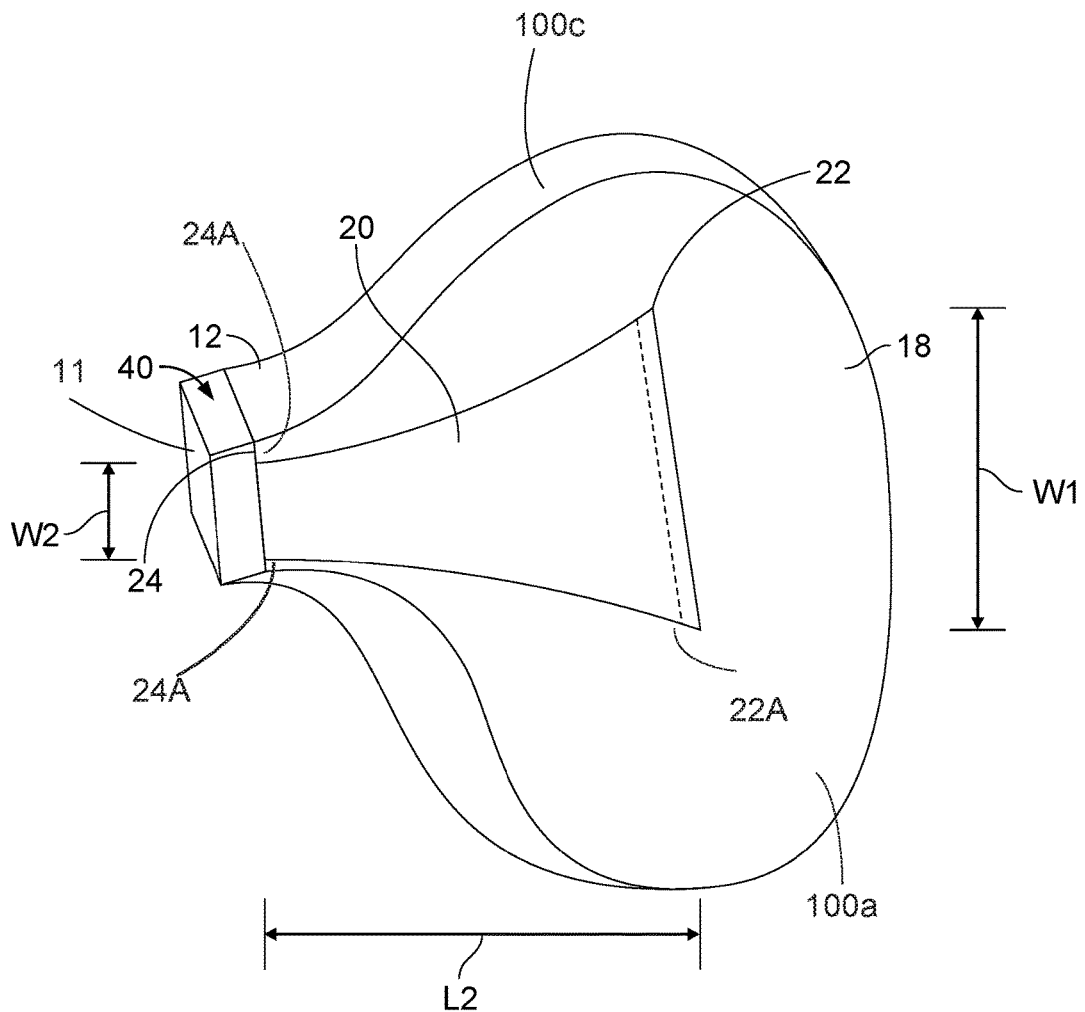
FIG. 6 is another perspective view showing a second side attachment of the externally attached guide panel.

With reference to FIGS. 5 and 6 an alternative embodiment is shown where the guide panel 20 is provided on a first side 16 of airbag 10 as illustrated in FIG. 5, wherein the first end 22 of guide panel 20 has the panel width W1 larger than the panel width W2 at the second end 24. In this embodiment, the panel 20 has a length L1 that extends almost to the front face portion 14 of the airbag cushion 10 and back to the neck region 12 or housing 40. This allows the airbag 10 to directionally deploy in such a fashion that the front face portion 14 of the airbag 10, as in the other embodiments, will impact the occupant prior to the guide panel 20 being fully taut, however, the guiding of the airbag deployment is still maintained by the use of the guide panel 20 on the side. This allows the airbag 10 to be directionally pulled, if so desired, to one side of the airbag 10. If the airbag 10 is pulled on one side, it can be pulled towards a vehicle door or window to help protect the occupant in the event of a crash, especially an occupant seated in what is known as an out-of-position seating position. In FIG. 5 end 22 of the panel 20 is secured by a sewn seam and end 24 is secured by another seam. Other types of joining fabrics and methods are within the scope of the present invention. In a second embodiment shown in FIG. 6, on the opposite side 18 a second guide panel 20 can be employed. In this embodiment, the guide panel 20 is shown affixed to the airbag module housing 40. As in each of the embodiments, this is an option for the second end to be affixed either to the airbag 10 or to the airbag housing 40 as illustrated. In all of the various embodiments, securement to the housing can be implemented by riveting or bolting an end of panel 20 to the housing. If the housing is plastic the airbag can be sonically welded to the housing. The dynamic benefits of the invention will be achieved whether the guide panel 20 is in an upper, lower or a side location or right or left side location. As shown in regard to FIG. 6, the guide panel 20 has a width W2 at its second end 24 and a width W1 at the first end 22 and a length L2. In this embodiment, the length L2 being shorter will cause the guide panel 20 to tighten more rapidly on deployment in such a way that it can directionally pull the airbag 10 in a direction to the same side as the panel 20. If guide panels 20 are used on each side with the guide panels of differing length, as a combination of FIGS. 5 and 6, then the shorter guide panel 20 will tighten first, the second guide panel 20 will tighten secondly pulling the airbag 10 into alignment. In other words, should it be desirable the airbag 10 be directionally pulled in one direction and then pulled back in an opposite direction, the use of two guide panels 20 of different lengths can provide this feature.

As a further alternative to the present invention, while shown in FIGS. 2-4, the use of one guide panel 20 has been shown on either an upper or lower location, it is possible, however, that both the upper and lower location can have a guide panel 20. In such a case, the directionality of an upper and lower guide panel 20 insures the airbag 10 will ultimately move in a linear path substantially perpendicular to the first end 22 and second end 24 after both panels are tensioned. This is important in that in the prior art the front panel can become skewed during inflation.

With the present invention, on deployment, these guide panels 20 provide a guiding means that directionally insures the airbag 10 will flow in a direction substantially perpendicular to the secured ends 22 and 24. As shown, in each of the embodiments, the ends 22, 24 are substantially parallel to the other, in such a fashion that the guide panels 20 will tighten uniformly across the airbag 10 on deployment and as the guide panels 20 tighten, these panels provide the directional control of the airbag 10. It is important to note that in the preferred embodiment the guide panel 20 is a separate component attached only at its ends 22, 24; accordingly, it is not attached nor does it have any breakaway seams that will break upon deployment, but simply relies on the length and width of the guide panel 20 to insure that the directionality of the inflation gases inflate the airbag 10 so that the deployment is consistently controlled directionally. The guide panel 20 is stitched, welded, or otherwise attached at the first end 22 and second end 24 at the airbag or housing attachment locations. Conceivably the guide panel can be part of a side panel of the airbag but this would be an inefficient use of material.

As shown in the figures, it is preferable the guide panel 20 if used on the top or bottom of the airbag have a width at least approximating the width of the neck portion 12 of the airbag 10, which is usually the narrowest region of an airbag. It is important that the guide panel 20 have such a wide width as opposed to being just a string or cord in order to provide the directionality and control on deployment; it is important the guide panel 20 be wide enough that it acts as a tightened web that directionally controls the airbag 10. If it were a narrow cord or string, no directionality would be achieved as effectively as in the present invention. With a rectangular guide panel or trapazoidally shaped panel 20, as shown in the embodiments, and even more particularly with the width W2, W1 increasing as taught in FIGS. 5 and 6, which is also applicable to any of the other embodiments, the guide panel 20 is able to control the deployment of the airbag 10 without any twisting, but will directionally move the airbag 10 in any direction that the guide panel 20 is oriented by the attachment at the first end 22 to the airbag 10.

While it is preferred the guide panel 20 be made of a material similar to the airbag 10 cushion, it is possible to use other materials if so desired. It is important to remember the guide panel 20 only be attached at two regions and that the guide panel 20 have a width sufficiently wide to prevent twisting or skewing of the airbag 10 absent the control of the guide panel 20.

Variations in the present invention are possible in light of the description of it provided herein. While certain representative embodiments and details have been shown for the purpose of illustrating the subject invention, it will be apparent to those skilled in this art that various changes and modifications can be made therein without departing from the scope of the subject invention. It is, therefore, to be understood that changes can be made in the particular embodiments described which will be within the full intended scope of the invention as defined by the following appended claims.

What is claimed is:

1. An airbag (100) comprising:
    an inflatable airbag cushion (102) having panels of material joined to create the inflatable airbag cushion including a neck portion (12) for receiving inflation gas at an inflation inlet (11) and a generally opposed front face portion (14), the inflatable airbag cushion inflates upon deployment during an accident from a stowed uninflated condition providing a safety barrier for an occupant;
    an externally attached guide panel (20) of material having first (22) and second (24) ends wherein a) the first end is secured to the airbag and b) the second end is connected at the neck portion of the airbag cushion or c) the second end is affixed in close proximity to the neck of the cushion near the inflation inlet or d) the second end of the guide panel is secured at a housing; and
    wherein the externally attached guide panel is only attached at the first and second ends and upon inflation of the airbag cushion the externally attached guide panel tightens between the first and second ends directing the airbag deployment towards a seat-belted occupant and wherein the airbag cushion has an upper portion and a lower portion and the externally attached guide panel is connected either to the upper or lower portion, and further comprises a second externally attached guide panel connected at first or second ends and positioned oppositely to the externally attached guide panel on an opposed upper or lower portion.

2. The airbag of claim 1 wherein the first end attached to the airbag at least half the distance from neck or housing securement to the front face portion.

3. The airbag of claim 1 wherein the externally attached guide panel has a width relative to a length and the width at least approximates a width of the neck portion of the airbag cushion.

4. The airbag of claim 1 wherein the externally attached guide panel has a length L1 shorter than the distance between the neck portion and an outermost region of the front face portion, insuring the front face portion upon inflation initially contacts the occupant.

5. The airbag of claim 1 wherein a connection of the first end and a connection of the second end of the guide panel extend across the width of the guide panel and wherein the guide panel extends at an angle relative to the direction of airbag deployment.

6. The airbag of claim 1 wherein the inflatable airbag cushion is configured to fit inside a passenger side airbag housing.

7. An airbag (100) comprising:
    an inflatable airbag cushion (102) having panels of material joined to create the inflatable airbag cushion including a neck portion (12) for receiving inflation gas at an inflation inlet (11) and a generally opposed front face portion (14), the inflatable airbag cushion inflates upon deployment during an accident from a stowed uninflated condition providing a safety barrier for an occupant;
    an externally attached guide panel (20) of material having first (22) and second (24) ends wherein a) the first end location is secured to the airbag and b) the second end is connected at the neck portion of the airbag cushion or c) the second end is affixed in close proximity to the neck of the cushion near the inflation inlet or d) the second end of the guide panel is secured at a housing; and
    wherein the externally attached guide panel is only attached at the first and second ends and upon inflation of the airbag cushion the externally attached guide panel tightens between the first and second ends directing the airbag deployment towards a seat-belted occupant wherein the airbag cushion further includes a pair of sides, a first side and a second opposite side wherein the externally attached guide panel is connected to one of the first or second opposite sides at the first and second ends having a length L1 to control deployment along the first or the second side wherein the airbag cushion will contact the occupant prior to the externally attached guide panel being fully taut while pulling on one side of the airbag cushion toward a vehicle door or window.

8. The airbag of claim 7 further comprises a second externally attached guide panel, the second externally attached guide panel being connected to an opposite side of the airbag cushion relative to the externally attached guide panel, wherein the second externally attached guide panel has a length L2 shorter than the length L1 of the oppositely connected externally connected airbag panel causing the second externally connected guide panel to tighten more rapidly on deployment to pull the airbag cushion directionally in one direction and then pulled back in an opposite direction as the longer length L1 guide panel tightens secondarily.

* * * * *